2,713,065
α-ACETOPHENYLCINNAMONITRILES AND DERIVATIVES THEREOF

Kurt Rorig, Chicago, Ill., assignor to G. D. Searle & Co., Chicago, Ill., a corporation of Illinois No Drawing. Application June 30, 1952, Serial No. 296,480

9 Claims. (Cl. 260—465)

The present invention relates to a new group of organic nitriles and their preparation and, more particularly, to the condensation of an aceto-α-tolunitrile with benzaldehydes and the products produced by this reaction. The reaction can be represented by structural formulas as follows:

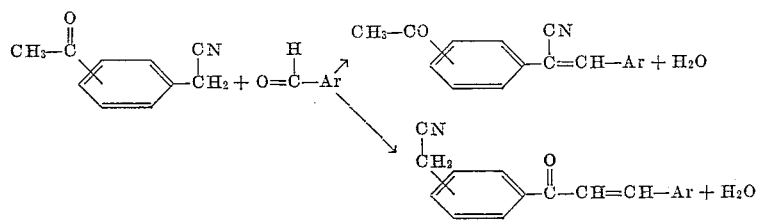

In these formulas Ar is either a phenyl or a substituted phenyl radical. Since the aceto-α-tolunitrile molecule contains an active methylene as well as an active methyl group, attack of the aldehyde group occurs on both of these places. It has been found that the methylene group between the nitrile radical and the benzene ring is more active than the methyl group adjacent to the carbonyl radical and therefore the reaction mixture contains a larger quantity of the α-acetophenylcinnamonitrile than of the cyanomethylchalcone. The two isomers can be separated by fractional crystallization.

In the above structural formulas Ar represents a phenyl radical which may be substituted by such groups as lower alkyl, hydroxy, lower alkoxy, halogen, nitro, amino, lower dialkylamino and cyano radicals.

The products of this condensation reaction are valuable medicinal agents especially because of their antagonism of endocrine functions, particularly of desoxycorticosterone-like adrenocorticoid activity. They also are useful as intermediates in organic synthesis. Thus hydrolysis of the nitriles yields the free acids which can then be esterified to form medicinally useful lower dialkylaminoalkyl esters.

The examples below illustrate in detail some of the compounds which comprise this invention and methods for their production. However this invention is not to be construed as limited thereby in spirit or in scope. In each of these examples temperatures are given uncorrected in degrees centigrade (°C.), pressures in millimeters (mm.) of mercury and relative amounts of materials in parts by weight.

EXAMPLE 1

*α-(4-acetophenyl)cinnamonitrile*

A mixture of 22 parts of 4-acetotolunitrile and 15 parts of benzaldehyde in 320 parts of methanol is heated to the boiling point and then treated at that temperature with 1 part of sodium methoxide. On scratching and cooling a precipitate forms which is collected on a filter and washed with ethanol. It melts at about 128–134° C. On recrystallization from ethanol an ivory colored product is obtained which melts at about 133–139° C. It consists of a mixture of α-(4-acetophenyl)cinnamonitrile and some 4-cyanomethylchalcone in which the former predominates. These compounds have the structural formulas

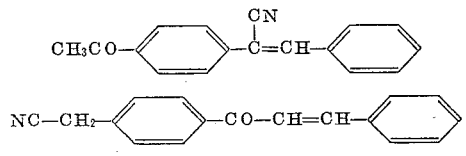

EXAMPLE 2

*4-isopropyl-α-(3-acetophenyl)cinnamonitrile*

A boiling solution of 159 parts of 3-acetotolunitrile and 148 parts of cumaldehyde in 1600 parts of methanol is treated with 5 parts of sodium methoxide. On cooling there precipitates a mixture of 4-isopropyl-α-(3-acetophenyl)cinnamonitrile and some 3'-cyanomethyl-4-isopropylchalcone. The predominating isomer can be obtained in a greater degree of purity by successive recrystallizations from ethanol and dioxane. The products have the structural formulas

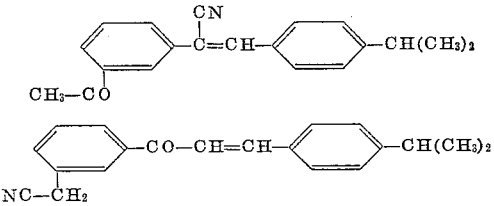

EXAMPLE 3

*4-methoxy-α-(3-acetophenyl)cinnamonitrile*

A solution of 79.5 parts of 3-acetotolunitrile and 68 parts of 4-anisaldehyde in 480 parts of methanol is heated to the boiling point of the mixture and then treated with 20 parts of a 10% solution of sodium methoxide in methanol. On standing at room temperature the mixture becomes dark brown and on cooling to 0° C. a tacky yellow precipitate forms which is taken up in absolute ethanol. An oil forms which on standing in cold ethanol gradually solidifies to a yellow solid. The mixture of 4-methoxy-α-(3-acetophenyl)-cinnamonitrile and some 3'-cyanomethyl-4-methoxychalcone melts at about 92–93° C. These compounds have the structural formulas

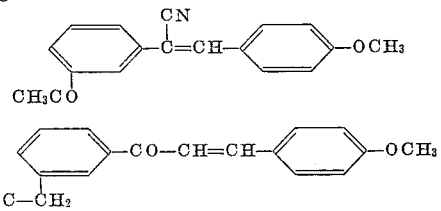

Purification of the predominant isomer by recrystallization from ethanol yields crystals melting at about 102.5-103.5° C.

EXAMPLE 4

*3-methoxy-α-(4-acetophenyl)cinnamonitrile*

A solution of 136 parts of 3-methoxybenzaldehyde and 159 parts of 4-acetotolunitrile in 800 parts of methanol is heated to boiling and treated with 10 parts of sodium methoxide. There is an immediate formation of a dark color and upon cooling a pale yellow fluffy product precipitates which melts at about 110–116° C. In this mixture of 3-methoxy-α-(4-acetophenyl)cinnamonitrile and some 4'-cyanomethyl-3-methoxychalcone the former isomer predominates. Two recrystallizations from ethanol yield crystals melting at about 124–126° C. containing the predominant isomer in relatively pure form.

EXAMPLE 5

*4-methoxy-α-(4-acetophenyl)cinnamonitrile*

A solution of 47.7 parts of 4-acetotolunitrile and 40.8 parts of 4-anisaldehyde in 480 parts of methanol is heated to the boiling point and treated with 3 parts of sodium methoxide. Immediately a precipitate forms which consists of 4-methoxy-α-(4-acetophenyl)cinnamonitrile and some 4'-cyanomethyl-4-methoxychalcone. It is collected on a filter and washed with ethanol. The canary yellow crystals obtained by recrystallization from ethanol melt at about 150.5–152° C.

EXAMPLE 6

*3-methoxy-4-hydroxy-α-(4-acetophenyl)cinnamonitrile*

A solution of 159 parts of 4-acetotolunitrile and 152 parts of vanillin in 1000 parts of boiling methanol is treated with 10 parts of sodium methoxide. Upon standing at room temperature a mixture of 3-methoxy-4-hydroxy-α-(4-acetophenyl)cinnamonitrile and some 4'-cyanomethyl-3-methoxy-4-hydroxychalcone precipitates. The compounds have the structural formulas

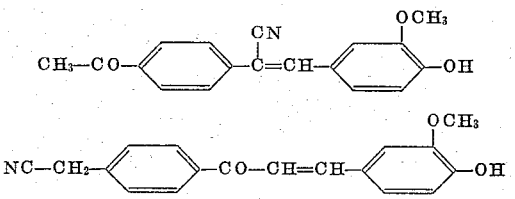

The predominating isomer can be obtained by recrystallization from ethanol.

EXAMPLE 7

*4-chloro-α-(4-acetophenyl)cinnamonitrile*

A boiling solution of 80 parts of 4-acetotolunitrile and 70 parts of 4-chlorobenzaldehyde in 1000 parts of methanol is treated with 5 parts of sodium methoxide and permitted to stand at room temperature for 45 minutes. The resulting precipitate of the mixture of 4-chloro-α-(4-acetophenyl)cinnamonitrile and some 4'-cyanomethyl-4-chlorochalcone melts at about 133–138° C. The products have the structural formulas

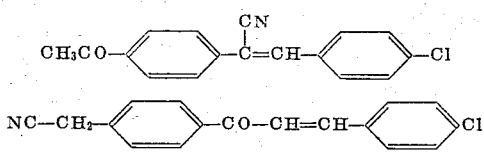

On recrystallization from ethanol white crystals are obtained, melting at about 136–143° C.

EXAMPLE 8

*2-bromo-α-(4-acetophenyl)cinnamonitrile*

A solution of 63.6 parts of 4-acetotolunitrile and 74 parts of 2-bromobenzaldehyde in 520 parts of methanol is heated to about 35° C. and treated with 5 parts of sodium methoxide. Within two minutes long slender needles of an ivory colored solid are formed which are collected on a filter. They melt at about 137–142° C. and contain 2-bromo-α-(4-acetophenyl)cinnamonitrile and some 4'-cyanomethyl-2-bromochalcone. The products have the structural formulas

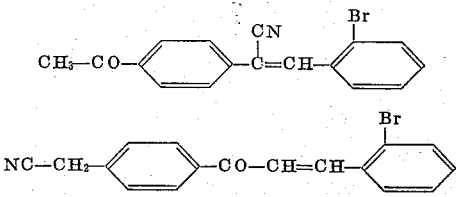

Upon recrystallization from ethanol white needles of the predominant isomer are obtained in relatively pure form, melting at about 146–147° C.

EXAMPLE 9

*2-amino-α-(3-acetophenyl)cinnamonitrile*

A solution of 159 parts of 3-acetotolunitrile and 121 parts of anthranilaldehyde in 1000 parts of boiling methanol is treated with 10 parts of sodium methoxide. The solution becomes colored at once and a yellow fluffy precipitate is formed which is collected on a filter. This mixture contains 2-amino-α-(3-acetophenyl)cinnamonitrile and some 3'-cyanomethyl-2-aminochalcone which have the structural formulas

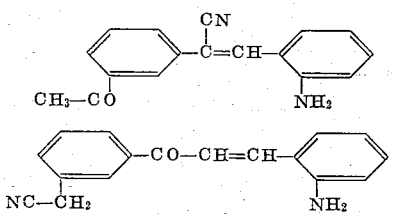

EXAMPLE 10

*4-dimethylamino-α-(4-acetophenyl)cinnamonitrile*

A solution of 159 parts of 4-acetotolunitrile and 149 parts of 4-dimethylaminobenzaldehyde in 1600 parts of methanol is treated with 10 parts of sodium methoxide. The resulting yellow product is dried. It melts at about 198–200° C. with softening at 190° C. and consists of 4-dimethylamino-α-(4-acetophenyl)cinnamonitrile and some 4'-cyanomethyl-4-dimethylaminochalcone. Upon repeated recrystallization from dioxane the predominant isomer is obtained in relatively pure form, melting at about 200–201° C. The predominant isomer has the structural formula

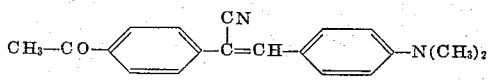

EXAMPLE 11

*4-cyano-α-(3-acetophenyl)cinnamonitrile*

A mixture of 159 parts of 3-acetotolunitrile and 131 parts of 4-cyanobenzaldehyde in 1600 parts of methanol is heated to the boiling point and treated with 10 parts of sodium methoxide whereupon the mixture becomes dark brown and a tan solid solidifies within a few minutes. An oil soon deposits on top of this solid. This mixture consists of 4-cyano-α-(3-acetophenyl)cinnamonitrile and some 3'-cyanomethyl-4-cyanochalcone. This semi-solid oil is removed and dried. The decanted liquid soon deposits a well-crystallized substance, melting at about 120–125° C. Recrystallized from the monoethyl ether of ethylene glycol and washed with alcohol the predominant isomer is obtained as an ivory-colored solid sintering at 130° C. and melting at about 137–141° C. It has the structural formula

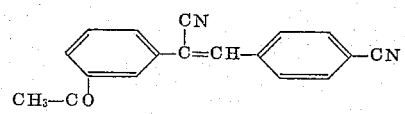

EXAMPLE 12

*4-cyano-α-(4-acetophenyl)cinnamonitrile*

A mixture of 636 parts of 4-acetotolunitrile and 524 parts of 4-cyanobenzaldehyde in 10,000 parts of methanol is heated to the boiling point and treated with 40 parts of sodium methoxide and dissolved in methanol. An immediately forming very light yellow precipitate is obtained. It contains 4-cyano-α-(4-acetophenyl)cinnamonitrile and some 4'-cyanomethyl-4-cyanochalcone. After addition of 1600 parts of cold ethanol the precipitate is collected on a filter and washed with cold ethanol. Recrystallized from dioxane using charcoal decolorization the predominant isomer is obtained in colorless crystals melting at 238–239.5° C.

I claim:
1. The compounds of the structural formula

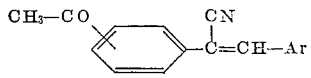

where in Ar is a member of the class consisting of phenyl, lower alkylphenyl, methoxyphenyl, hydroxyphenyl, cyanophenyl, aminophenyl, di-(lower alkyl)aminophenyl radicals and halophenyl radicals wherein the halogen has an atomic weight greater than 30 and smaller than 100.

2. The compounds of the structural formula

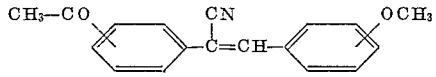

3. The compounds of the structural formula

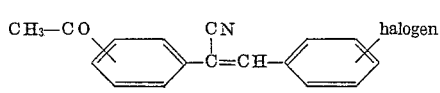

wherein the halogen has an atomic weight greater than 30 and smaller than 100.

4. The compounds of the structural formula

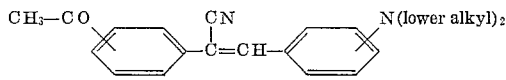

5. 4-dimethylamino-α-(4-acetophenyl)cinnamonitrile.

6. The compounds of the structural formula

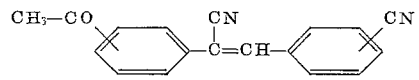

7. The compounds of the structural formula

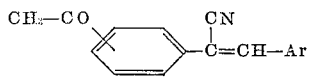

wherein Ar is a monocyclic aromatic hydrocarbon radical.

8. The compounds of the structural formula

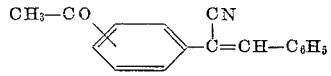

9. α-(4-acetophenyl)cinnamonitrile.

References Cited in the file of this patent

UNITED STATES PATENTS

| | | |
|---|---|---|
| 2,307,700 | Moore | Jan. 5, 1943 |
| 2,589,377 | Henecka | Mar. 18, 1952 |